(12) United States Patent
Babaria et al.

(10) Patent No.: US 10,931,624 B2
(45) Date of Patent: Feb. 23, 2021

(54) SERVICE DEPENDENT IP ADDRESSES

(71) Applicant: Tata Communications (America) Inc., Herndon, VA (US)

(72) Inventors: Jigar Babaria, Herndon, VA (US); Srinivasa Nadar, Fairfax, VA (US)

(73) Assignee: Tata Communications (America) Inc., Herndon, VA (US)

( * ) Notice: Subject to any disclaimer, the term of this patent is extended or adjusted under 35 U.S.C. 154(b) by 367 days.

(21) Appl. No.: 15/544,853

(22) PCT Filed: Jan. 19, 2016

(86) PCT No.: PCT/US2016/013894
§ 371 (c)(1),
(2) Date: Jul. 19, 2017

(87) PCT Pub. No.: WO2016/118498
PCT Pub. Date: Jul. 28, 2016

(65) Prior Publication Data
US 2018/0013717 A1   Jan. 11, 2018
US 2018/0316644 A2   Nov. 1, 2018

Related U.S. Application Data

(60) Provisional application No. 62/105,402, filed on Jan. 20, 2015.

(51) Int. Cl.
*H04L 29/12* (2006.01)
*H04L 12/715* (2013.01)
(Continued)

(52) U.S. Cl.
CPC .......... *H04L 61/1541* (2013.01); *H04L 45/04* (2013.01); *H04L 45/72* (2013.01);
(Continued)

(58) Field of Classification Search
None
See application file for complete search history.

(56) References Cited

U.S. PATENT DOCUMENTS 6,154,839 A    11/2000  Arrow et al.
6,965,599 B1   11/2005  Sakurai et al.
(Continued)

OTHER PUBLICATIONS

"Office Action" issued in related European Patent Application No. 16703666.4, dated May 7, 2018, 6 pages.
(Continued)

*Primary Examiner* — Ayaz R Sheikh
*Assistant Examiner* — Mariela Vidal Carpio
(74) *Attorney, Agent, or Firm* — Kaplan Breyer Schwarz, LLP (57) ABSTRACT

A system that enables end-user devices that operate within different enterprise networks to exchange data with one another. In particular, the disclosed system uses unique IP addresses that are dedicated solely to supporting a predefined communication service between enterprise computer networks, in order to identify and route each data packet according to the communications service. As part of the communications service, the data packets are transmitted, for example, from a first local service provider network hosting a first enterprise network, through a participating backbone service provider network on the public Internet and based on deterministic routing, and to a second local service provider network hosting a second enterprise network. In handling the data packets in this way, the disclosed system creates an Internet wide-area-network (WAN): the data packets are transmitted over the Internet and conceivably over a large geographic distance between enterprise networks.

6 Claims, 6 Drawing Sheets

(51) Int. Cl.
*H04L 12/721* (2013.01)
*H04L 12/723* (2013.01)
*H04L 29/06* (2006.01)
*H04L 12/46* (2006.01)

(52) U.S. Cl.
CPC ...... H04L 61/2007 (2013.01); H04L 61/2061 (2013.01); H04L 61/2503 (2013.01); *H04L 12/4683* (2013.01); *H04L 45/50* (2013.01); *H04L 61/2557* (2013.01); *H04L 63/0272* (2013.01)

(56) References Cited

U.S. PATENT DOCUMENTS

| | | | |
|---|---|---|---|
| 7,111,163 | B1 | 9/2006 | Haney |
| 7,796,619 | B1 * | 9/2010 | Feldmann .............. H04L 41/12 370/401 |
| 8,392,698 | B2 | 3/2013 | Gundavelli et al. |
| 8,856,924 | B2 | 10/2014 | Holloway et al. |
| 2003/0179761 | A1 * | 9/2003 | Dobbins ................ H04L 45/00 370/401 |
| 2004/0223497 | A1 * | 11/2004 | Sanderson .......... H04L 12/4641 370/395.52 |
| 2006/0268681 | A1 * | 11/2006 | Raza ..................... H04L 45/02 370/216 |
| 2009/0086640 | A1 * | 4/2009 | Zhang .................... H04L 47/70 370/241 |
| 2009/0213837 | A1 * | 8/2009 | Ku .......................... H04L 47/12 370/352 |
| 2010/0284305 | A1 * | 11/2010 | Papp .................. H04L 12/4641 370/254 |
| 2011/0002301 | A1 * | 1/2011 | Chan .................... H04W 40/36 370/331 |
| 2011/0149979 | A1 * | 6/2011 | Uttaro .................... H04L 45/04 370/401 |
| 2012/0099592 | A1 | 4/2012 | Ludwig |
| 2012/0317252 | A1 * | 12/2012 | Vemulapalli ........ H04L 61/2046 709/221 |
| 2014/0019519 | A1 | 1/2014 | Burman et al. |
| 2015/0040238 | A1 | 2/2015 | Sarsa |
| 2015/0092785 | A1 * | 4/2015 | Torvi ..................... H04L 45/02 370/401 |

OTHER PUBLICATIONS

Authorized Officer: Pettersson, Hans, "International Search Report and Written Opinion" issued in counterpart PCT application No. PCT/US2016/013894, dated May 3, 2016.
Srisuresh, "IP Network Address", pp. 1-32, http://www.sanface.com/txt2pdf.html.
"Classification Overview", "Cisco IOS Quality of Service Solutions Configuration Guide", Publisher: Cisco.
Authorized Officer: Hong Lei (Dr), Examination report issued in related Singapore Patent Application No. 11201801199P dated Mar. 18, 2019.
Summons to Attend Oral Proceedings issued in counterpart EP patent application No. 16703666.4, Jan. 11, 2019, 7 pp.
Summons to Attend Oral Proceedings issued in counterpart EP patent application No. 16703666.4, Jan. 24, 2019, 3 pp.
Authorized Officer: Hong Lei (Dr), Written Opinion issued in counterpart SG patent application No. 11201801199P, dated May 15, 2018, 7 pp.
Brief Communication issued in counterpart EP patent application No. 16703666.4, dated May 22, 2019, 7 pp.
Estrin Usc T Li Y Rekhter Cisco Systems K Varadhan D Zappala USC D: "Source Demand Routing: Packet Format and Forwarding Specification (Version 1).; rfc1940.txt", Source Demand Routing: Packet Format and Forwarding Specification (Version 1)?.; RFC1940. Txt, Internet Engineering Task Force, IETF; Standard, Internet Society (ISOC) 4, Rue Des Falaises CH-1205 Geneva, Switzerland, May 1, 1996 (May 1, 1996) XP015007724.
Formalities Officer: Schur, Marlene, Decision to Refuse issued in counterpart European patent application No. 16703666.4, Jun. 26, 2019, 22 pp.

* cited by examiner

SERVICE DEPENDENT IP ADDRESSES

CROSS REFERENCE TO RELATED APPLICATIONS

The following U.S. provisional application is incorporated herein by reference: U.S. Patent Application Ser. No. 62/105,402, filed Jan. 20, 2015. If there are any contradictions or inconsistencies in language between this application and the provisional application that has been incorporated by reference that might affect the interpretation of the claims in this application, the claims in this application should be interpreted to be consistent with the language in this application.

FIELD OF THE INVENTION

The present invention relates to telecommunications in general, and, more particularly, identifying a communication for routing purposes using Internet Protocol addresses that are allocated by and shared amongst Internet service provider networks.

BACKGROUND OF THE INVENTION

A private network, in an Internet addressing architecture context, is a network that uses private Internet Protocol (IP) address space, following the standards set by RFC 1918. These addresses are commonly used for home, office, and enterprise local area networks (LAN) or other types of enterprise computer networks.

A virtual private network (VPN) extends a private network, as defined above, across a public network, such as the Internet. It enables users to send and receive data across shared or public networks as if their computing devices (i.e., user devices) were directly connected to the private network; as a result, they benefit from the functionality, security, and management policies of the private network. Establishing a virtual point-to-point connection through the use of dedicated connections, virtual tunneling protocols, and/or traffic encryption creates a VPN.

Multiprotocol Label Switching (MPLS) is a mechanism in high-performance telecommunications networks that directs data from one network node to the next based on short path labels instead of long network addresses. The use of short path labels in MPLS avoids complex lookups in a routing table. The labels identify virtual links between distant nodes instead of endpoints.

MPLS can be used to create a VPN. An MPLS-based VPN provides the flexibility to transport and route several types of network traffic using the technologies of a MPLS backbone. However, MPLS must be deployed in all such networks in order for user devices in different networks to communicate with each other. Imposing such a requirement on all networks in which the user devices are communicating with one another across the networks might not be realistic in certain situations. For economic or other reasons, many enterprise computer networks in remote locations, for example, do not have such an MPLS structure in place.

SUMMARY OF THE DISCLOSURE

The present invention enables end-user devices that operate within different enterprise computer networks to exchange data with one another, while avoiding at least some of the disadvantages in the prior art. In particular, the disclosed system and method uses unique IP addresses that are dedicated solely to supporting a predefined communication service between enterprise computer networks (or "enterprise networks"), in order to identify and route each data packet according to the communications service. As part of the communications service, the data packets are transmitted, for example, from a first local service provider network hosting a first enterprise network, through a participating backbone service provider network on the public Internet and based on deterministic routing, and to a second local service provider network hosting a second enterprise network. For security purposes, the data packets are also encrypted. In handling the data packets, or other types of communications, in this way the disclosed system and method create an Internet wide-area-network (WAN): the data packets are transmitted over the Internet and conceivably over a large geographic distance between enterprise networks.

Each local service provider network (e.g., a local Internet service provider network, etc.) that is providing access to an enterprise computer network and participating in the communication service i) allocates initially a set of Internet Protocol (IP) addresses (e.g., 500 IP addresses, etc.) and ii) propagates its set to all of the other local service provider networks that are participating. The propagation of the sets of IP addresses is coordinated by the aforementioned backbone service provider network (e.g., a backbone Internet service provider network, etc.), which is also participating in the service. When each participating local service provider network receives a set of IP addresses, the recipient knows to treat any communication that contains an allocated IP address, either that it had allocated or that another service provider network had allocated and shared, in accordance with the communications service.

The system of the illustrative embodiment has certain advantages over at least some telecommunications systems in the prior art. A system based on Multiprotocol Label Switching (MPLS) requires private networks to be implemented (i.e., networks that use private Internet Protocol (IP) address space), which might be economically unfeasible in certain situations such as at remote enterprise network locations. In contrast, the disclosed system does not require private networks or that a virtual private network (VPN) be established, although the disclosed system is able to coexist with such networks. Also, in the disclosed system, the same data communication route can be used between an enterprise network and its local service provider for both i) an Internet WAN connection (i.e., to exchange data packets with a different enterprise network) as disclosed herein and ii) a connection to a general resource on the public Internet (e.g., google.com, etc.).

An additional advantage that the disclosed system has over other methods of data transfer over the Internet is that the data being transferred are made more secure by routing the data through predetermined network routes, such as through the participating backbone network mentioned earlier, instead of through varying routes that are determined conventionally by the public Internet, and on a packet-by-packet or at least a stream-by-stream basis.

An illustrative system comprises: a first computer system (221) in a first local service provider network (202-1), wherein the first computer system is configured to: (i) receive (602) a source address of a first stream of data packets, and (ii) assign (603) a first Internet Protocol (IP) address to the first stream of data packets, wherein the first IP address is selected from a first non-empty pool of IP addresses that are allocated only to fulfilling a predefined service, wherein the first computer system is configured to assign the first IP address based on a) the source address belonging to a first computer network (111-1) that is subscribed to the predefined service and b) a destination address of the first stream of data packets belonging to a second computer network (111-2) that is also subscribed to the predefined service, and wherein the first local service provider network provides the first computer network with connectivity to the Internet; and a plurality of networking devices (305, 306, 307) that are configured to route the first stream of data packets, when received from the first local service provider network, to a second local service provider network (202-2) based on the first IP address being assigned to the first stream and in accordance with the predefined service, wherein the second local service provider network provides the second computer network with connectivity to the Internet.

An illustrative method comprises: receiving (602), by a first computer system (221) in a first local service provider network (202-1), a source address of a first stream of data packets; and assigning (603), by the first computer system, a first Internet Protocol (IP) address to the first stream of data packets, wherein the first IP address is selected from a first non-empty pool of IP addresses that are allocated only to fulfilling a predefined service, wherein the assigning of the first IP address is based on a) the source address belonging to a first computer network (111-1) that is subscribed to the predefined service and b) a destination address of the first stream of data packets belonging to a second computer network (111-2) that is also subscribed to the predefined service, and wherein the first local service provider network provides the first computer network with connectivity to the Internet; and routing the first stream of data packets, by a plurality of networking devices (305, 306, 307) when received from the first local service provider network, to a second local service provider network (202-2) based on the first IP address being assigned to the first stream and in accordance with the predefined service, wherein the second local service provider network provides the second computer network with connectivity to the Internet.

Another illustrative system comprises: a first computer system (221) in a first local service provider network (202-1), wherein the first computer system is configured to: (i) allocate (501) a first set of IP addresses only to fulfilling a predefined service, (ii) announce (502) the first set of IP addresses in accordance with the Border Gateway Protocol (BGP) such that the first set of IP addresses is propagated to a second local service provider network (202-2) via a backbone service provider network (311), (iii) receive (602) a source address of a first stream of data packets, and (iv) assign (603) a first Internet Protocol (IP) address to the first stream of data packets, wherein the first IP address is selected from a first non-empty pool of IP addresses that are allocated only to fulfilling the predefined service and that comprises the first set, wherein the first computer system is configured to assign the first IP address based on a) the source address and b) a destination address of the first stream of data packets belonging to a computer network (111-2) in a second local service provider network (202-2), and wherein the first and second local service provider networks provide the first and second computer networks, respectively, with connectivity to the Internet; and a second computer system (222) in the second local service provider network (202-2), wherein the second computer system is configured to: (i) allocate (511) a second set of IP addresses only to fulfilling the predefined service, (ii) announce (512) the second set of IP addresses in accordance with the Border Gateway Protocol (BGP) such that the second set of IP addresses is propagated to the first local service provider network via the backbone service provider network; wherein the first local service provider network is configured to route the first stream of data packets to the second local service provider network (202-2) via the backbone service provider network based on the first IP address being assigned to the first stream and in accordance with the predefined service.

Another illustrative method comprises: allocating (501), by a first computer system (221) in a first local service provider network (202-1), a first set of IP addresses only to fulfilling a predefined service; announcing (502), by the first computer system, the first set of IP addresses in accordance with the Border Gateway Protocol (BGP) such that the first set of IP addresses is propagated to a second local service provider network (202-2) via a backbone service provider network (311); receiving (602), by the first computer system, a source address of a first stream of data packets; assigning (603), by the first computer system, a first Internet Protocol (IP) address to the first stream of data packets, wherein the first IP address is selected from a first non-empty pool of IP addresses that are allocated only to fulfilling the predefined service and that comprises the first set, wherein the assigning of the first IP address is based on a) the source address and b) a destination address of the first stream of data packets belonging to a computer network (111-2) in a second local service provider network (202-2), and wherein the first and second local service provider networks provide the first and second computer networks, respectively, with connectivity to the Internet; allocating (511), by a second computer system (222) in the second local service provider network (202-2), a second set of IP addresses only to fulfilling the predefined service, wherein the first computer system allocates the first set of IP addresses and the second computer system allocates the second set of IP addresses independently of each other; announcing (512), by the second computer system, the second set of IP addresses in accordance with the Border Gateway Protocol (BGP) such that the second set of IP addresses is propagated to the first local service provider network via the backbone service provider network; and routing (604), by the first local service provider network, the first stream of data packets to the second local service provider network via the backbone service provider network, based on the first IP address being assigned to the first stream and in accordance with the predefined service.

DETAILED DESCRIPTION

Figure 1:
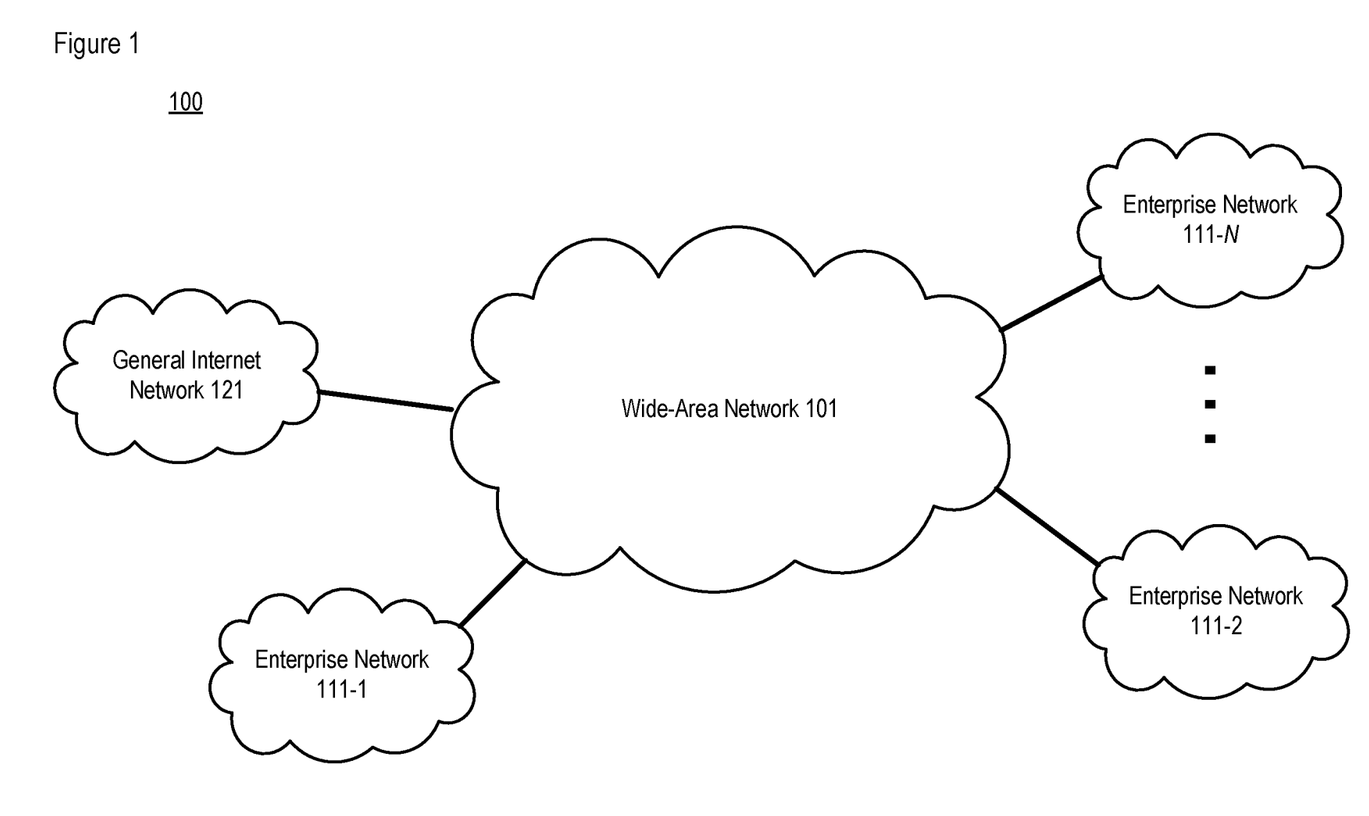
FIG. 1 depicts telecommunications system 100.

FIG. 1 depicts telecommunications system 100, in accordance with the illustrative embodiment of the present invention. Telecommunications system 100 comprises wide-area network 101, enterprise networks 111-1 through 111-N, wherein N is a positive integer, and general Internet network 121, interrelated as shown.

Wide-area network (WAN) 101 is wide-area-network-based, in that it is a telecommunications network that extends over a large geographical distance. Because WAN 101 in particular is an Internet WAN, it extends over the large geographical distance via at least some networking devices that are considered to be part of the public Internet and provides multi-location connectivity over the public Internet. WAN 101 comprises a plurality of Internet service provider networks of various forms, and is described in detail below and with regard to FIG. 2. An Internet service provider (ISP) is an organization that provides services for accessing, using, and/or participating in the Internet. In some embodiments of the present invention, an ISP provides services for accessing, using, and/or participating in public Internet. Some of the more specific classifications of an ISP network is "local", "tier 2", and "tier 1", as described elsewhere in this specification. In some embodiments of the present invention, a first ISP network is differentiated from a second ISP network, in that the first and second ISP networks require Border Gateway Protocol (BGP) in order to communicate with each other, while within the first ISP network BGP is not required (but possibly still used).

Enterprise network 111-$n$, wherein n can have a value between 1 and N, inclusive, is a computer network (i.e., a first computer network, a second computer network, and so on) that comprises customer premises equipment (CPE) with dedicated Internet access (DIA). The CPE comprises one or more of user devices (e.g., personal computer, personal digital assistant, smartphone, feature phone, etc.), routers, switches, residential gateways, fixed mobile convergence products, networking adapters, and Internet access gateways that enable the enterprise to access a communications service provider's services and distribute them around the enterprise to individual users via a local area network (LAN). Enterprise network 111-$n$ can be used, operated, possessed, and/or owned by an enterprise (i.e., a business or company) or by a different entity. In some embodiments, at least some of the enterprise networks can be used, operated, possessed, and/or owned by the same enterprise and subscribed to one or more or the same services.

General Internet network 121 is part of the Internet, the global system of interconnected computer networks that use the Internet protocol suite (TCP/IP) to link billions of user devices and networking devices worldwide. Specifically, general Internet network 121 is that part of the Internet which is not used by WAN 101 to provide connectivity amongst enterprise networks 111-1 through 111-N. As those who are skilled in the art will appreciate after reading this specification, at least some of the infrastructure that defines general Internet network 121 can be situated in the same geographic region as at least some of the infrastructure the defines WAN 101, or can be highly-interconnected to WAN 101 infrastructure, or both.

Figure 2:
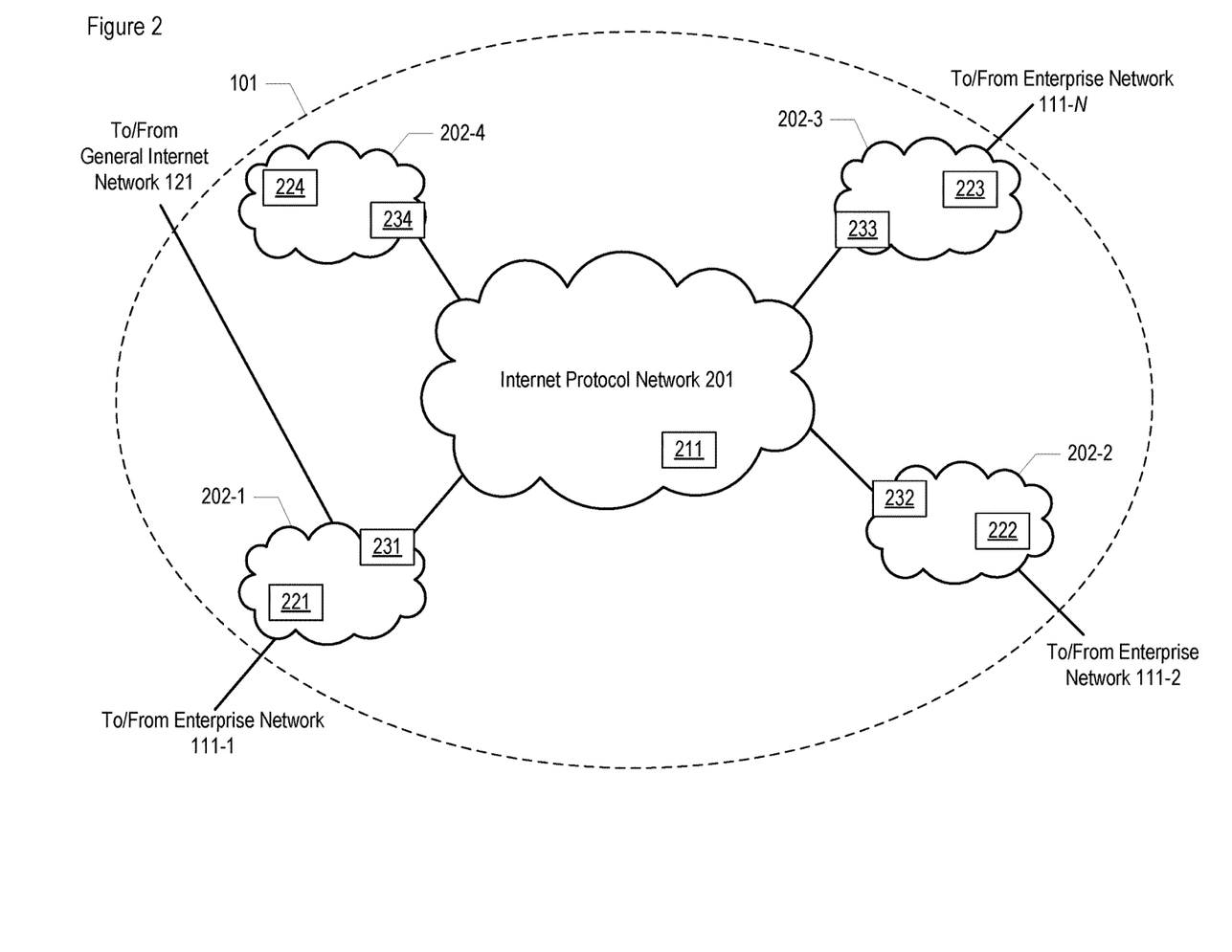
FIG. 2 depicts wide-area network (WAN) 101 within telecommunications system 100.

FIG. 2 depicts wide-area network (WAN) 101 within telecommunications system 100. WAN 101 comprises local Internet service provider (ISP) networks 202-1 through 202-M, wherein M is equal to four as depicted, and Internet Protocol (IP) network 201. The ISP networks and IP network 201 make up at least a portion of the public Internet.

Local Internet service provider network 202-$m$, wherein m can have a value of between 1 and M, inclusive, provides user devices of its end users with access to WAN 201 and general Internet 121. More generally, and consistent with the description of an ISP above, ISP network 202-$m$ provides connectivity for accessing, using, and/or participating in the Internet. As depicted, the local Internet service provider networks are part of WAN 101; however, in some other embodiments, one or more of the local service provider networks can be separate from WAN 101. Four ISP networks 202-1 through 202-4 are depicted as constituting WAN 101. As those who are skilled in the art will appreciate after reading this specification, however, WAN 101 can comprise any number of ISP networks. More generally, local ISP network 202-$m$ can be referred to as "local service provider network 202-$m$".

Each local ISP network comprises one or more computer systems, such as computer systems 221 through 224 corresponding to ISP networks 202-1 through 202-4, respectively, as well as other computer networking equipment. Each computer system represents a system of one or more interconnected computers such as a server computer, for example and without limitation. Computer systems 221 through 224 are described below. Two or more local ISP networks promote robust connectivity to one another, in part through service-level agreements (SLA) and encryption.

In some embodiments of the present invention, each local ISP network is distinguished from other networks in WAN 101, by at least one edge router being arranged between the local ISP network and IP network 201 or between the local ISP network and any other public network in general. As depicted, edge router 231 sets such a boundary for (i.e., demarcates) local ISP network 202-1, edge router 232 demarcates network 202-2, edge router 233 demarcates local ISP network 202-3, and edge router 234 demarcates local ISP network 202-4.

Internet Protocol network 201 comprises one or more tier 1 and/or tier 2 service provider networks, and is described below and with respect to FIG. 3. IP network comprises computer system 211, also described below.

Relevant to wide-area network 101 in general, Internet service providers establish the worldwide connectivity between individual networks at various levels of scope. Operating within enterprise networks 111-1 through 111-N, end users who only access the Internet when needed to perform a function or obtain information, represent the bottom of the Internet routing hierarchy. At the top of the Internet routing hierarchy are the tier 1 networks, including tier-1 network 311 described below and with respect to FIG. 3, large telecommunication companies that exchange traffic directly with each other via peering agreements. In at least some embodiments of the present invention, a tier 1 network can reach every other network on the Internet without purchasing IP transit or paying settlements; by this definition, a tier 1 network is a transit-free network that peers with every other tier 1 network. Tier 2 and lower level networks buy Internet transit from other providers to reach at least some parties on the global Internet, though they might also engage in peering. An Internet service provider may use a single upstream provider for connectivity, or implement multihoming to achieve redundancy and load balancing. Internet exchange points are major traffic exchanges with physical connections to multiple Internet service providers.

Each of network 201 and networks 202-1 through 202-4 comprises computer-networking devices, which can include gateways, routers, network bridges, switches, hubs, and repeaters. The computer-networking devices that constitute the networks depicted in FIG. 2 can also include hybrid network devices such as multilayer switches, protocol converters, bridge routers, proxy servers, firewalls, network address translators, multiplexers, network interface controllers, wireless network interface controllers, modems, ISDN terminal adapters, line drivers, wireless access points, networking cables, and other related hardware.

At least some of the computer-networking devices that are present in WAN 101 use routing tables in their operating system to direct IP packets to the next-hop router or destination. Routing tables are maintained by manual configuration or automatically by routing protocols. The end-user devices in each enterprise network typically use a default route that points toward an ISP providing transit, while ISP routers (e.g., edge routers 231-234, etc.) use the Border Gateway Protocol (BGP) to establish the most efficient routing across the complex connections of the global Internet.

Figure 3:
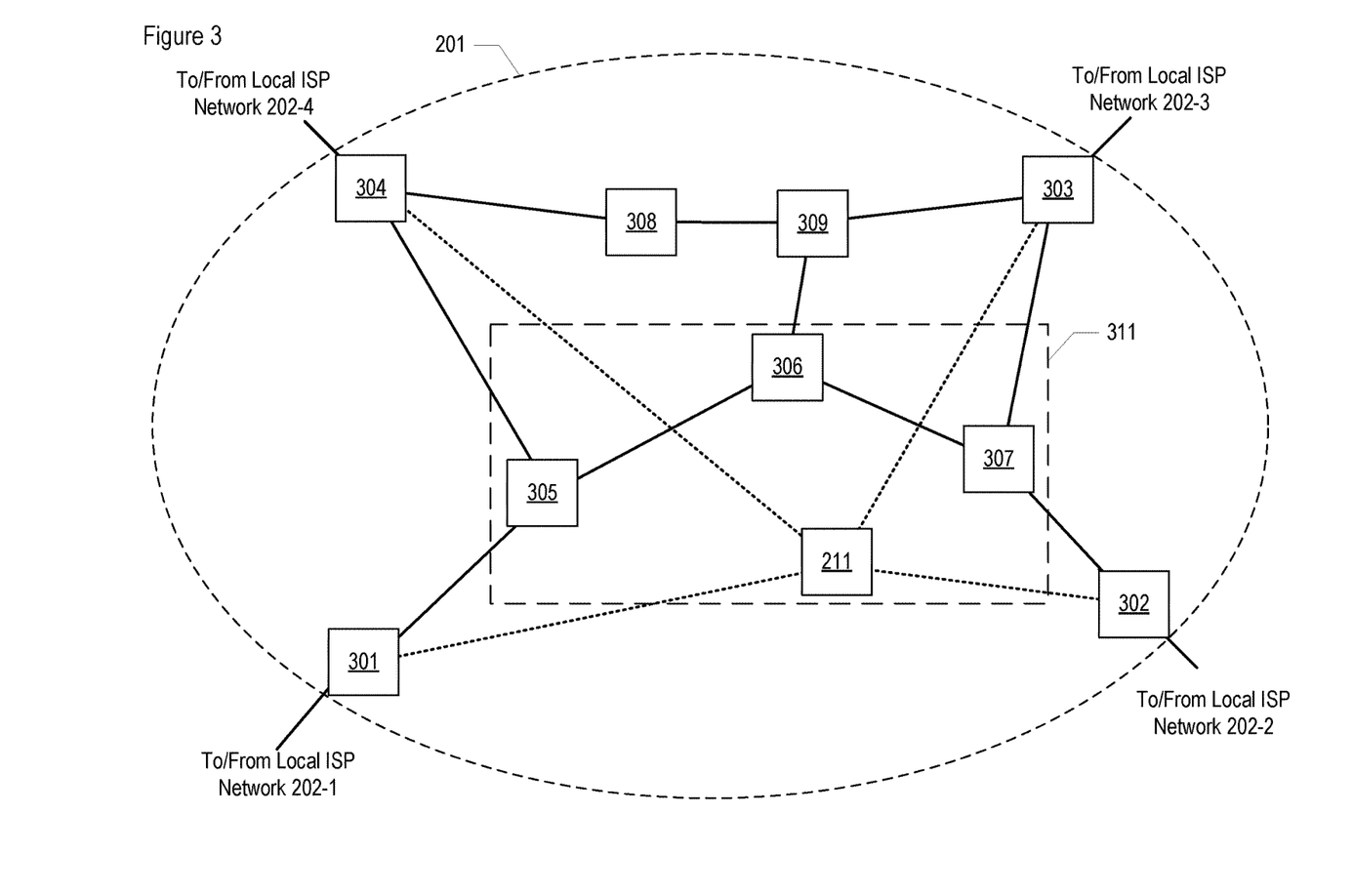
FIG. 3 depicts Internet Protocol network 201 within WAN 101.

FIG. 3 depicts Internet Protocol network 201 within WAN 101. IP network 201 comprises one or more tier-level service provider networks, including backbone IP network 311. Each service provider network in WAN 101 comprises one or more computer networking devices, including at least some of the same types of networking devices (e.g., routers, etc.) that are described above and with respect to IP network 201. As depicted, IP network 201 comprises computer system 211 and routers 301 through 309, interconnected as shown. Although nine routers are depicted, network 201 can comprise any number of routers and networking devices in general. Backbone IP network 311 can be alternatively referred to as a "backbone service provider network", which, in some embodiments of the present invention, can be specifically a backbone Internet service provider network.

Backbone IP network 311 comprises computer system 211 and routers 305 through 307. As described below and with respect to FIG. 4, computer system 211 comprises a server computer and performs at least some of the controlling tasks depicted in FIG. 5, and interworks with computer systems 221 through 224 in local ISP networks 202-1 through 202-4, as described below. Although three routers are depicted, network 311 can comprise any number of routers and networking devices in general. Furthermore, in some alternative embodiments of the present invention, first and second networking devices that are part of a given service provider network (e.g., network 311, etc.) might be separated by at least one networking device belonging to a different service provider network, through which one or more data packets must pass to get from the first networking device to the second.

As depicted, at least one computer-networking device is arranged between a networking device in network 311 and a local ISP network 202, wherein the intermediate computer-networking device belongs to a different service provider network than network 311. For example and without limitation, router 301 is arranged between router 305 and service provider network 202-1. As those who are skilled in the art will appreciate after reading this specification, however, there can be any number of such intermediate devices, or no intermediate device at all, between network 311 and a local ISP network 202, in various combinations between network 311 and the various local ISP networks 202. Furthermore, where there are multiple intermediate devices between network 311 and a particular local ISP network 202, different sets of these intermediate devices can belong to different service provider networks.

In accordance with the illustrative embodiment, network 311 is a tier 1 IP network. In some alternative embodiments of the present invention, however, network 311 is a different type of service provider network, such as a tier 2 IP network, for example and without limitation.

IP network 311 is capable of coordinating quality-of-service- (QoS-) enabled IP service for traffic prioritization throughout wide-area network 201. As video and voice are latency-sensitive applications, it is inefficient to give file-sharing and email applications the same priority in the delivery. IP network 311 enables wide-area network 201 to provide video, voice, and other latency-sensitive applications higher QoS to improve the network utility.

IP network 311 is further capable of coordinating managed encryption throughout wide-area network 201. Secure communications can be achieved through traditional security technology, such as IPSec, or through other means. For traditional IPSec deployment, IP network 311 manages all the customer connections and managed routers. For non-entity country sites, IP network 311 manages the overall provisioning, fault reporting, trouble-shooting co-ordinations and billing as a complete managed service. IP network 311 is responsible for the overall IPSec tunnel configuration and on-going maintenance. This extends to support IPSec VPN clients running on PCs/Laptops, tablets, and smartphones. The managed encryption service provides tunnel-less encryption without encrypting the IP header to preserve the IP header information. The managed encryption platform can support regular key renewal mechanism to further increase the security level of the packets between two enterprise network endpoints.

Figure 4:
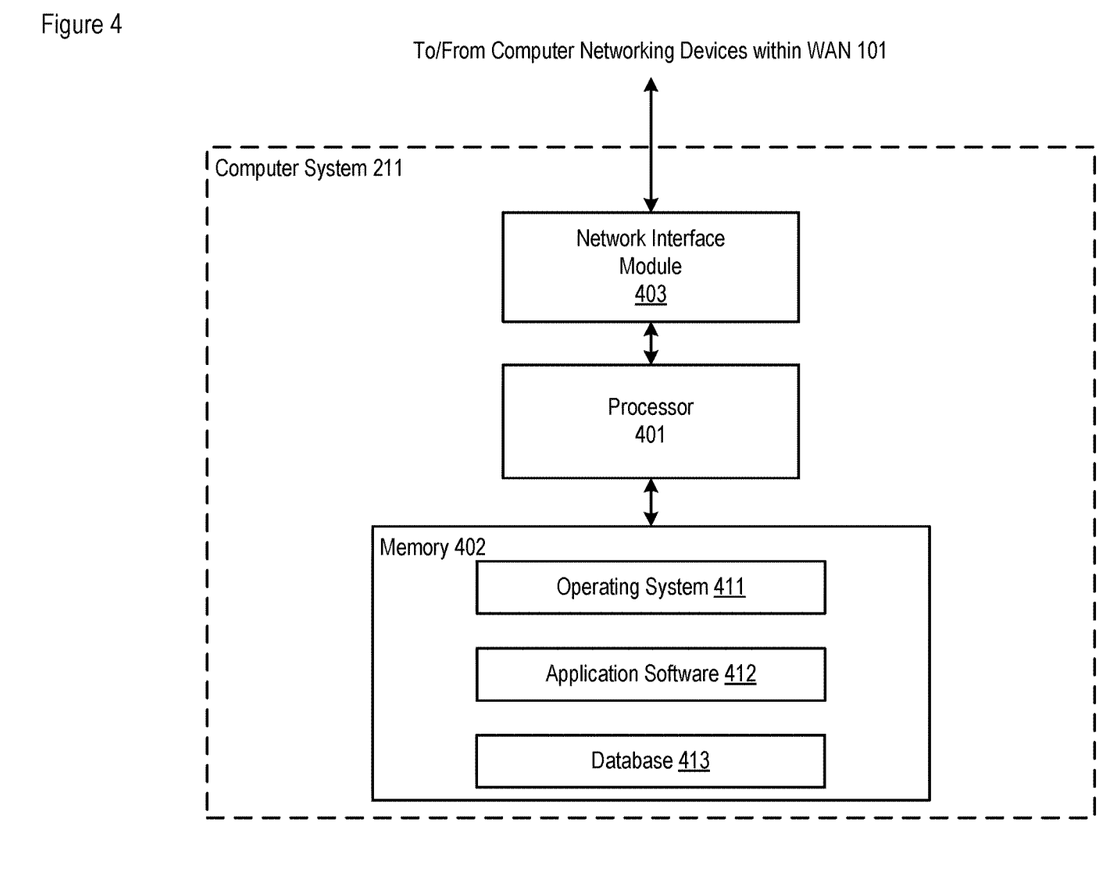
FIG. 4 depicts a block diagram of the salient components of computer system 211 within IP network 311.

FIG. 4 depicts a block diagram of the salient components of computer system 211 within backbone IP network 311, in accordance with the illustrative embodiment of the present invention. Computer system 211 comprises: processor 401, memory 402, and network interface module 403, which are interconnected as shown.

Computer system 211 comprises at least one server computer that performs at least some of the tasks disclosed herein. As those who are skilled in the art will appreciate after reading this specification, the hardware platform performing at least some of the tasks performed by computer system 211 can be embodied as a multi-processor platform, as a sub-component of a larger computing platform, as a virtual computing element, or in some other computing environment—all within the scope of the present invention.

As those who are skilled in the art will appreciate after reading this specification, computer system 211 can be a different type of apparatus than a server computer, and can be referred to by a different name such as a data-processing system, a computing device, or another type of hardware platform that comprises one or more processors, one or more memories, and one or more network interfaces, for example and without limitation.

Processor 401 is a general-purpose processor that is configured to execute operating system 411 and application software 412, and to populate, amend, use, and manage database 413, as described in detail below and in the accompanying figures. For the purposes of this specification, a "processor" is defined as one or more computational elements, whether co-located or not and whether networked together or not.

Memory 402 is non-transitory and non-volatile computer storage memory technology that is well known in the art (e.g., flash memory, etc.). Memory 402 is configured to store operating system 411, application software 412, and database 413. The operating system is a collection of software that manages computer system 211's hardware resources and provides common services for computer programs, such as those that constitute the application software. The application software that is executed by processor 401 enables computer system 211 to perform at least some of the functions disclosed herein. Database 413 comprises information about one or more allocated unique IP addresses, as described below.

It will be clear to those having ordinary skill in the art how to make and use alternative embodiments that comprise more than one memory 402; or comprise subdivided segments of memory 402; or comprise a plurality of memory technologies that collectively store the operating system, application software, and database.

Network interface module 403 comprises a network adapter configured to enable computer system 211 to transmit information to and receive information from other parts of telecommunications system 100, via the networking devices throughout WAN 101.

In regard to computer systems 231 through 234, each of these computer systems is similar to computer system 211 described above and with respect to FIG. 4. Each of these computer systems comprises at least one server computer that performs at least some of the tasks disclosed herein. As those who are skilled in the art will appreciate after reading this specification, the hardware platform performing at least some of the tasks performed by one or more of computer systems 231 through 234 can be embodied as a multi-processor platform, as a sub-component of a larger computing platform, as a virtual computing element, or in some other computing environment—all within the scope of the present invention.

As those who are skilled in the art will appreciate after reading this specification, any or all of computer systems 231 through 234 can be a different type of apparatus than a server computer, and can be referred to by a different name such as a data-processing system, a computing device, or another type of hardware platform that comprises one or more processors, one or more memories, and one or more network interfaces, for example and without limitation.

Additionally, each local service provider network 202 can comprise multiple hardware platforms (e.g., server computers, etc.) that are part of computer systems 231 through 234, wherein each hardware platform performs a different subset of the tasks disclosed herein. For example and without limitation, within local service provider network 202-1, the tasks of i) accessing a database, ii) distributing a list of IP addresses, and iii) assigning an IP address from a database can be performed by any combination of one or more hardware platforms.

Figure 5:
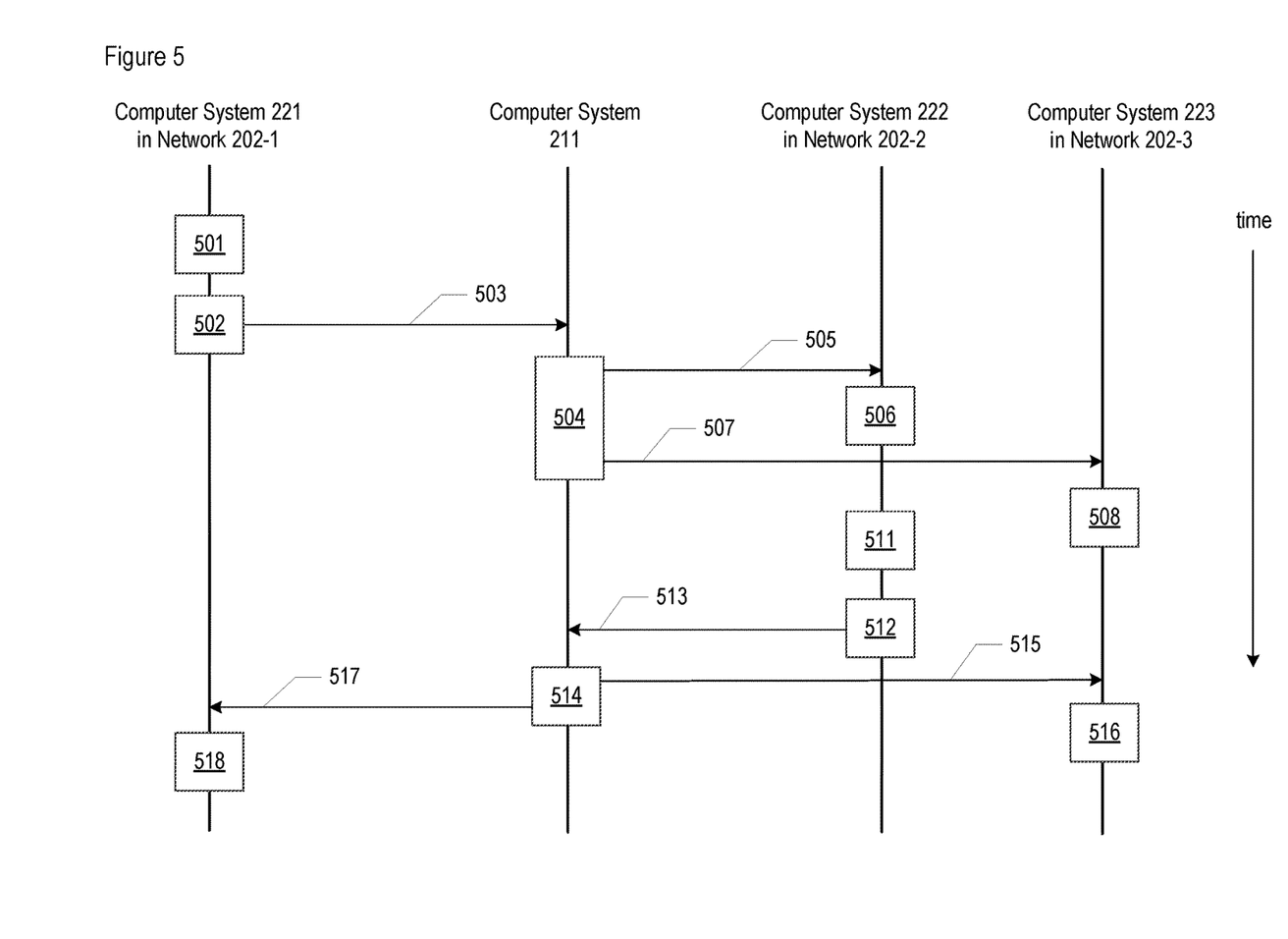
FIG. 5 depicts a message flow diagram of the salient processes for allocating and sharing IP addresses
Figure 6:
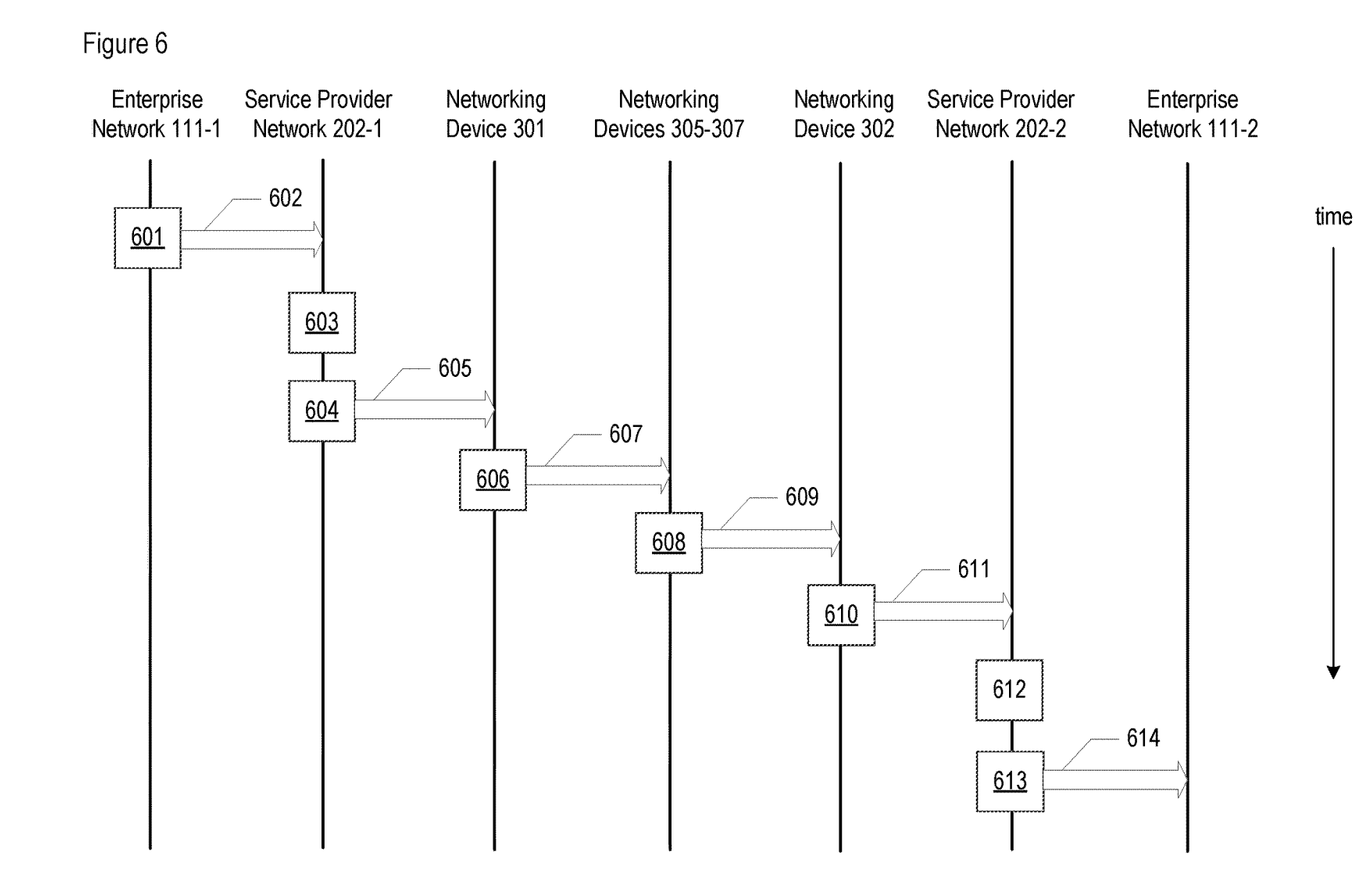
FIG. 6 depicts a message flow diagram of the salient processes for processing a stream of data based one or more of the allocated and shared IP addresses.

FIGS. 5 and 6 depict message flow diagrams that are representative of an operating scenario of telecommunications system 100. The operating scenario features a technique for identifying a communication (e.g., packet, datagram, frame, cell, protocol data unit, message, etc.) for routing purposes, with predetermined Internet Protocol addresses. As reflected in the message flow diagrams, WAN 101 provides a dedicated and deterministic route for customers in enterprise networks 111-1 through 111-N for predetermined delivery over the public Internet. In particular, WAN 101 uses specific BGP attributes, such as local preference and community tagging, and selective IP address exchange among backbone network 311 and the local ISP networks, as described below, to enable deterministic routing. WAN 101 also provides a dedicated and deterministic route for enterprise customers to reach services that are provided within general Internet network 121, such as cloud service providers that include Google Cloud Platform, for example and without limitation.

The processes performed by telecommunications system 100 of the illustrative embodiment are depicted in the drawings (i.e., FIGS. 5 and 6) as being performed in a particular order. It will, however, be clear to those skilled in the art, after reading this disclosure, that such operations can be performed in a different order than depicted or can be performed in a non-sequential order (e.g., in parallel, etc.). In some embodiments of the present invention, some or all of the depicted processes might be combined or performed by different devices than depicted. In some embodiments of the present invention, some of the depicted processes might be omitted.

FIG. 5 depicts a message flow diagram of the salient processes for allocating and sharing IP addresses, in accordance with the illustrative embodiment of the present invention.

Each local service provider network **202-*m* can allocate a non-empty set of IP addresses to be associated with one or more predefined services discussed herein, and stores the set in its database. In accordance with the illustrative embodiment of the present invention, each local service provider network 202-*m* allocates its set of IP addresses independently of the other local service provider networks. Accordingly, a first set of IP addresses allocated by network 202-1, for example, and a second set of IP addresses allocated by network 202-2 might be disjoint with respect to each other, might intersect each other, might have a relationship of one being a proper subset or superset with respect to the other, and so on. Illustratively, computer system 221 of service provider network 202-1 performs this at task 501, and computer system 222 of service provider network 202-2 performs this at task 511**.

In accordance with the illustrative embodiment of the present invention, the local service providers are prohibited from communicating with each other directly in order to achieve the desired, deterministic routing results. Thus, each local service provider network **202-*m* shares its allocated set of IP addresses via a central coordinator so that the other local service providers will recognize all of the sets of IP addresses as being associated with the predefined service or services. Backbone network 311** serves in this role of central coordinator and handling the sharing of IP addresses.

There are various techniques through which backbone network 311 facilitates the sharing of the IP addresses. In a first technique, each service provider network **202-*m* provides its set of IP addresses to a central coordinator (e.g., computer system 211 of backbone network 311, etc.) automatically (e.g., via data packets as a set is created/updated, etc.); then, the central coordinator automatically forwards the IP addresses from each of the service provider networks to all of the service provider networks. With respect to FIG. 5, at task 502, computer system 221 in network 202-1 transmits its set of IP addresses allocated at task 501, to computer system 211 in network 311 via message 503. This transaction can be handled via the mechanism in Border Gateway Protocol (BGP), which is used to announce new routes and to exchange IP addresses across any two local ISP networks. At task 504, computer system 211 than broadcasts the received set of IP addresses to the other local service provider networks, such as to computer system 222 of network 202-2 via message 505 and to computer system 223 of network 202-3 via message 507**.

Likewise, at task 512, computer system 222 in network 202-2 transmits its set of IP addresses allocated at task 511, to computer system 211 in network 311 via message 513. This transaction can be handled via the mechanism in Border Gateway Protocol (BGP) that is used to announce new routes. At task 514, computer system 211 than broadcasts the received set of IP addresses to the other local service provider networks, such as to computer system 223 of network 202-3 via message 515 and to computer system 221 of network 202-1 via message 517.

Each computer system 221, 222, and 223 in the respective partner networks 202-1, 202-2, and 202-3 that are participating in the predefined service update their databases with IP addresses associated with the predefined service when additional sets of IP addresses are received. As depicted in FIG. 5, at task 518, computer system 221 stores the IP addresses received in message 517 in its database. At task 506, computer system 222 stores the IP addresses received in message 506 in its database. Computer system 223 stores, at task 508, the IP addresses received in message 507 and, at task 516, the IP address received in message 515, in its database. In doing so, each computer system develops and maintains a pool (e.g., a first pool, a second pool, etc.) of IP addresses that are unique in that they are to be used for the predefined service only. In the long run, each pool maintained by each computer system contains the IP addresses shared amongst the partner local ISP networks.

As those who are skilled in the art will appreciate after reading this specification, other distribution techniques are possible and different combinations of features among the different techniques are possible. For example, in a second technique, each service provider network 202-m provides its set of IP addresses directly to the other service provider networks, based on a central coordinator (e.g., computer system 211, etc.) having identified, to each service provider, the other service providers that are participating. In a third technique, each service provider network 202-m provides its set of IP addresses to a central coordinator (e.g., the service provider of backbone network 311, etc.) manually (e.g., via email from a technician, etc.); then, the central coordinator manually provides the IP addresses from each of the service provider networks to all of the service provider networks.

FIG. 6 depicts a message flow diagram of the salient processes for processing a stream of data based one or more of the allocated and shared IP addresses in depicted in FIG. 5, in accordance with the illustrative embodiment of the present invention. In this scenario, a first user device operating within enterprise network 111-1 is attempting to communicate with a second user device operating within enterprise network 111-2 and according to a predefined service. The predefined service, at a minimum, comprises the use of deterministic routing through network 201 such that the data packets travel through at least one of the networking devices 305 through 307 within backbone network 311. The predefined service, in some embodiments, can comprise additional features, such as encryption and/or adherence to service parameters, as described below. The predefined service is implemented via sets of programs that execute on one or more of the computer systems and/or networking devices described herein.

At task 601, enterprise network 111-1 begins transmitting the stream of data packets originated by the first user device, via one or more messages 602.

Local service provider network 202-1 (e.g., in London) receives the data packets being received from network 111-1. Computer system 221 recognizes that the packets are from a customer (i.e., network 111-1) of the predefined service of the illustrative embodiment provided by network 311 and that the data packets are to be sent to enterprise network 111-2 according to the predefined service. More specifically, computer system 221 recognizes the source address and the destination of the data packets as both belonging to subscribers of the predefined service—namely networks 111-1 and 111-2. In some embodiments of the present invention, the source address and/or the destination address is represented as an IP address.

At task 603, and based on the aforementioned recognition of the addresses, computer system 221 of network 202-1 assigns a unique IP address with route prefix (e.g., 1.1.1.0/24) from an IP pool of addresses that are dedicated to the predefined service and that were previously allocated and shared in accordance with FIG. 5, so that all service provider networks will known that this connection is to be performed in accordance with the predefined service. For example and without limitation, this assigned IP address with route prefix can serve to identify the originator of the communication as being part of the predefined service. In contrast, if data packets received from enterprise network 111-1 are not being sent to another enterprise network and in accordance with the predefined service, then the next IP address can be assigned in a conventional manner by computer system 221. As a result of the IP address being assigned to the communication, the IP address is inserted into one or more of the data packets to be sent. In some alternative embodiments of the present invention, an addressing scheme is used without a route prefix being specified.

In some embodiments of the present invention, computer system 221 determines that the data packets that are to be sent to enterprise network 202-2 according to the predefined service and, as a result, also encrypts the data. In contrast, computer system 221 might not encrypt the data when the first user device within enterprise network 111-1 instead is attempting to access websites within general Internet network 121 such as "google.com".

If the received IP address is not an IP address corresponding to the predefined service, the data packets are sent through the general Internet network 121. On the other hand, if the received IP address is an IP address that corresponds to the predefined service, network 202-1 at task 604 sends the data packets to backbone network 311, which then forwards the data packets to local service provider network 202-2.

Because the predefined service is in effect for the current set of data packets, a particular route is determined in advance—in this example, one that traverses any intermediate networking devices, such as device 301, to backbone network 311, which then directs the data packets to local service provider network 202-2. Accordingly, at task 604, network 202-1 transmits the data packets to device 301 via messages 605 that consists of one or more messages, providing routing information to device 301 in the process.

Notably, device 301 is within a service provider network that is external to any service provider network (e.g., network 202-1, network 311, network 202-2, etc.) that is a knowing participant of the predefined service. It is merely a device within the public Internet. As a result, device 301 does not recognize any such allocated and shared IP addresses that are dedicated to the predefined service. However, because network 202-1 is a knowing participant of the predefined service, and has provided sufficient routing information in messages 605, device 301 (along with possibly additional "external" devices) is able to route the data packets specifically to backbone network 311, which does recognize the data packets as those to be handled according to the predefined service.

At task 606, device 301 routes the data packets to device 305 via messages 607. Devices 305, 306, and 307 within backbone network 311 successively forward the data packets. At task 608, device 307 routes the data packets to device 302 via messages 609. Notably, device 302 is within a service provider network that is external to any service provider network (e.g., network 202-1, network 311, network 202-2, etc.) that recognizes the allocated and shared IP addresses as being unique and dedicated to the predefined service. However, the routing information already accompanying the data packets enable device 302 (along with possibly additional "external" devices) to route the data packets to network 202-2.

At task 610, device 302 routes the data packets to local service provider network 202-2 via messages 611.

At task 612, computer system 222 of network 202-2 (e.g., in Hong Kong) recognizes the IP address as an address dedicated to the predefined service and, as did computer system 221 of network 202-1, assigns its own unique IP address with route prefix (e.g., 3.3.3.0/24) from an IP pool of addresses that are dedicated to the predefined service and that were previously allocated and shared in accordance with FIG. 5.

At task 613, network 202-2 transmits the data packets to enterprise network 111-2 via messages 614. Network 111-2 then delivers the data packets to the second user device (i.e., operating with network 111-2).

As the first and second user devices communicate with each other, those service provider networks that are partner networks in the predefined service recognize the data going back and forth are to be treated according to the predefined service due to the unique IP addresses assigned by service provider networks 202-1 and 202-2 and, as such, are knowing participants.

In accordance with the illustrative embodiment of the present invention, backbone network 311, by coordinating and enforcing the predefined service, provides deterministic routing of traffic. In addition, network 311 is further capable of guaranteeing end-to-end service-level agreements (SLA) and providing enterprise-grade customer service and reporting. This is achieved by requiring each local provider network 202-m to meet certain service parameters so that the predefined service is further capable of providing certain functionalities to end users, such as voice and other functionalities. These service parameters can include one or more of the following, in any combination:

i. Network Availability—The network availability is defined as the measured average up-time of dedicated Internet access (DIA) service between the network to network interconnection point(s) established between local provider and Customer, and each Service Location, on a monthly basis. The value is computed as follows: (720 hours−monthly unscheduled outage hours)/720 hours×100%. The total amount of outage hours is computed as the cumulative outage time reports confirmed by a local provider by means of trouble tickets throughout the month. The outage time starts when a ticket is opened in the local provider trouble ticket system and ends when the Service is restored.
  ii. Packet Loss—Packet Loss shall be measured as the percentage of 100 byte packets at 5 iterations of 100 trials, averaged over a one (1) month period (720 hours) lost between the Local provider Core IP POPs (meaning from Local provider IP Core Access Router to Local provider IP Core Access Router).
  iii. Latency—Latency is defined as the round trip delay required for a packet to travel between the ingress and egress port at Local provider' Core IP POPs (meaning from one Local provider IP Core Access Router to another Local provider IP Core Access Router). Latency is measured using 100-bytes packets every five (5) minute interval time and averaged over one (1) month (720 hours).
  iv. Jitter—Jitter is the delay variation of the packet arrival time. The Local provider measures the network jitter sending ten (10) 64-byte UDP packets every five (5) minutes interval time. Jitter measurement is calculated as an average of all test performed over a calendar month.
  v. Delivery Time—The service provider guarantees that the service installation date will meet the ready-for-service date agreed upon in the Service Order.
  vi. Mean Time to Restore—Mean Time to Restore (MTTR) is defined as the average time to restore network failures in a month. MTTR is measured dividing the total amount of outage hours, as stated above, by the number of outages registered and confirmed by Local provider in the trouble ticket system during the month.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising:
  a first computer system in a first local service provider network, wherein the first computer system is configured to:
    (i) allocate a first set of IP addresses only to fulfilling a predefined service,
    (ii) announce the first set of IP addresses in accordance with the Border Gateway Protocol (BGP) such that the first set of IP addresses is propagated to a second local service provider network via a backbone service provider network,
    (iii) receive a source address of a first stream of data packets, and
    (iv) assign a first Internet Protocol (IP) address to the first stream of data packets,
  wherein the first IP address is selected from a first non-empty pool of IP addresses that are allocated only to fulfilling the predefined service and that comprises the first set, wherein the first computer system is configured to assign the first IP address based on a) the source address belonging to a first computer network and b) a destination address of the first stream of data packets belonging to a second computer network in a second local service provider network, and wherein the first and second local service provider networks provide the first and second computer networks, respectively, with connectivity to the Internet; and
  a second computer system in the second local service provider network, wherein the second computer system is configured to:
    (i) allocate a second set of IP addresses only to fulfilling the predefined service,
    (ii) announce the second set of IP addresses in accordance with the Border Gateway Protocol (BGP) such that the second set of IP addresses is propagated to the first local service provider network via the backbone service provider network;
  wherein the first local service provider network is configured to route the first stream of data packets to the second local service provider network via the backbone service provider network based on the first IP address being assigned to the first stream and in accordance with the predefined service.

2. The system of claim 1 further comprising a plurality of networking devices that constitute the backbone service provider network and that are configured to route the first stream of data packets, when received from the first local service provider network (to the second local service provider network based on the first IP address being assigned to the first stream and in accordance with the predefined service.

3. The system of claim 1 wherein the second computer system is further configured to add the first set of IP addresses, when received, to a second non-empty pool of IP addresses that also comprises the second set of IP addresses.

4. A method comprising:

allocating, by a first computer system in a first local service provider network, a first set of IP addresses only to fulfilling a predefined service;

announcing, by the first computer system, the first set of IP addresses in accordance with the Border Gateway Protocol (BGP) such that the first set of IP addresses is propagated to a second local service provider network via a backbone service provider network;

receiving, by the first computer system, a source address of a first stream of data packets;

assigning, by the first computer system, a first Internet Protocol (IP) address to the first stream of data packets, wherein the first IP address is selected from a first non-empty pool of IP addresses that are allocated only to fulfilling the predefined service and that comprises the first set, wherein the assigning of the first IP address is based on a) the source address belonging to a first computer network and b) a destination address of the first stream of data packets belonging to a second computer network in a second local service provider network, and wherein the first and second local service provider networks provide the first and second computer networks, respectively, with connectivity to the Internet;

allocating, by a second computer system in the second local service provider network, a second set of IP addresses only to fulfilling the predefined service, wherein the first computer system allocates the first set of IP addresses and the second computer system allocates the second set of IP addresses independently of each other;

announcing, by the second computer system, the second set of IP addresses in accordance with the Border Gateway Protocol (BGP) such that the second set of IP addresses is propagated to the first local service provider network via the backbone service provider network; and routing, by the first local service provider network, the first stream of data packets to the second local service provider network via the backbone service provider network, based on the first IP address being assigned to the first stream and in accordance with the predefined service.

5. The method of claim 4 further comprising a plurality of networking devices that constitute the backbone service provider network and that are configured to route the first stream of data packets, when received from the first local service provider network, to the second local service provider network based on the first IP address being assigned to the first stream and in accordance with the predefined service.

6. The method of claim 4 wherein the second computer system is further configured to add the first set of IP addresses, when received, to a second non-empty pool of IP addresses that also comprises the second set of IP addresses.

* * * * *

UNITED STATES PATENT AND TRADEMARK OFFICE
CERTIFICATE OF CORRECTION

| | |
|---|---|
| PATENT NO. | : 10,931,624 B2 |
| APPLICATION NO. | : 15/544853 |
| DATED | : February 23, 2021 |
| INVENTOR(S) | : Jigar Babaria and Srinivasa Nadar |

It is certified that error appears in the above-identified patent and that said Letters Patent is hereby corrected as shown below:

On the Title Page

Item (54), and In the Specification, Column 1, Line 1, should read:
System and method for identifying a communication for routing purposes using Internet Protocol addresses that are allocated by and shared amongst Internet service provider networks Signed and Sealed this
Third Day of May, 2022

Katherine Kelly Vidal
*Director of the United States Patent and Trademark Office*